(12) United States Patent
Kempfert et al.

(10) Patent No.: US 8,815,120 B2
(45) Date of Patent: Aug. 26, 2014

(54) ALKALINE EARTH METAL SILICATE LUMINOPHORES AND METHOD FOR IMPROVING THE LONG TERM STABILITY THEREOF

(75) Inventors: Wolfgang Kempfert, Bad Liebenstein (DE); Sylke Rosler, Eisenach (DE); Sven Rosler, Eisenach (DE); Cheng-Jun Duan, Bad Salzungen (DE); Rudolf Dennstedt, Barchfeld (DE)

(73) Assignee: Leuchtstoffwerk Breitungen GmbH (DE)

( * ) Notice: Subject to any disclaimer, the term of this patent is extended or adjusted under 35 U.S.C. 154(b) by 165 days.

(21) Appl. No.: 13/501,609

(22) PCT Filed: Oct. 14, 2010

(86) PCT No.: PCT/EP2010/065380
§ 371 (c)(1),
(2), (4) Date: Apr. 12, 2012

(87) PCT Pub. No.: WO2011/045359
PCT Pub. Date: Apr. 21, 2011

(65) Prior Publication Data
US 2012/0193579 A1     Aug. 2, 2012

(30) Foreign Application Priority Data

Oct. 15, 2009   (DE) .......................... 10 2009 044 255

(51) Int. Cl.
| | | |
|---|---|---|
| *C09K 11/02* | (2006.01) | |
| *C09K 11/77* | (2006.01) | |
| *C09K 11/57* | (2006.01) | |
| *C09K 11/08* | (2006.01) | |

(52) U.S. Cl.
CPC .............. *C09K 11/02* (2013.01); *C09K 11/025* (2013.01); *C09K 11/576* (2013.01); *C09K 11/0838* (2013.01); *C09K 11/7734* (2013.01)
USPC .................... 252/301.4 F; 428/404; 428/403; 427/215

(58) Field of Classification Search
CPC .... C09K 11/02; C09K 11/025; C09K 11/576; C09K 11/0838; C09K 11/7734
USPC ............. 252/301.4 F; 428/404, 403; 427/215
See application file for complete search history.

(56) References Cited

U.S. PATENT DOCUMENTS

| | | | |
|---|---|---|---|
| 5,958,591 A | 9/1999 | Budd | |
| 6,303,051 B1 * | 10/2001 | Diaz et al. | ............... 252/301.4 F |
| 8,519,609 B2 | 8/2013 | Winkler et al. | |
| 2009/0050848 A1 | 2/2009 | Kim et al. | |
| 2010/0259156 A1 | 10/2010 | Winkler et al. | |

FOREIGN PATENT DOCUMENTS

| | | |
|---|---|---|
| DE | 293 128 A5 | 8/1991 |
| DE | 19937420 C1 | 12/2000 |
| DE | 698 30 180 T2 | 2/2006 |
| DE | 10 2007 053 285 A1 | 5/2009 |
| DE | 10 2007 056 343 A1 | 5/2009 |
| EP | 0887397 A1 | 12/1998 |
| EP | 1 124 913 B1 | 8/2001 |
| EP | 1160835 A1 | 12/2001 |
| WO | 0022065 A1 | 4/2000 |
| WO | 0056471 A1 | 9/2000 |
| WO | 2009003988 A1 | 1/2009 |
| WO | 2009065480 A1 | 5/2009 |

OTHER PUBLICATIONS

Guo, C., et al., "Study on the stability of phosphor SrAl2O4:Eu2+, Dy3+ in water and method to improve its moisture resistance", Materials Chemistry and Physics, 106 (2007), pp. 268-272 (5 pages total).
Guo, C. et al., "Improving the stability of alkaline earth sulfide-based phosphors", Applied Surface Science, 225 (2004), pp. 198-203 (6 pages total).

* cited by examiner

*Primary Examiner* — Carol M Koslow
(74) *Attorney, Agent, or Firm* — Mayer & Williams, PC; Ann Wieczorek

(57) ABSTRACT

The present invention relates to alkaline earth metal silicate luminophores having improved long-term stability and to a corresponding method for improving the long-term stability of alkaline earth metal silicate luminophores. The luminophore according to the invention is a luminophore comprising a base lattice according to the general chemical formula $EA_xSi_yO_z$, where x, y, z>0. The component EA is formed by one or more alkaline earth metals. An activator, for example $Eu^{2+}$ or $Mn^{2+}$, is doped into the base lattice. The luminophore has the fundamental property to absorb radiation in a first wavelength range and emit radiation in a second wavelength range that is different from the first wavelength range. The luminophore is designed in the form of crystals. According to the invention, the surfaces of the crystals of the luminophore are chemically modified such that at least portions of the surfaces thereof are formed by a chemical compound of the general formula $Ea_uZ_2$. The component Z is formed by anions, which can be chemically combined with the EA cations of the luminophore. The variable u is equal to an ion charge of the anions Z. The chemical modification is therefore not a coating.

8 Claims, 3 Drawing Sheets

Figure 1:
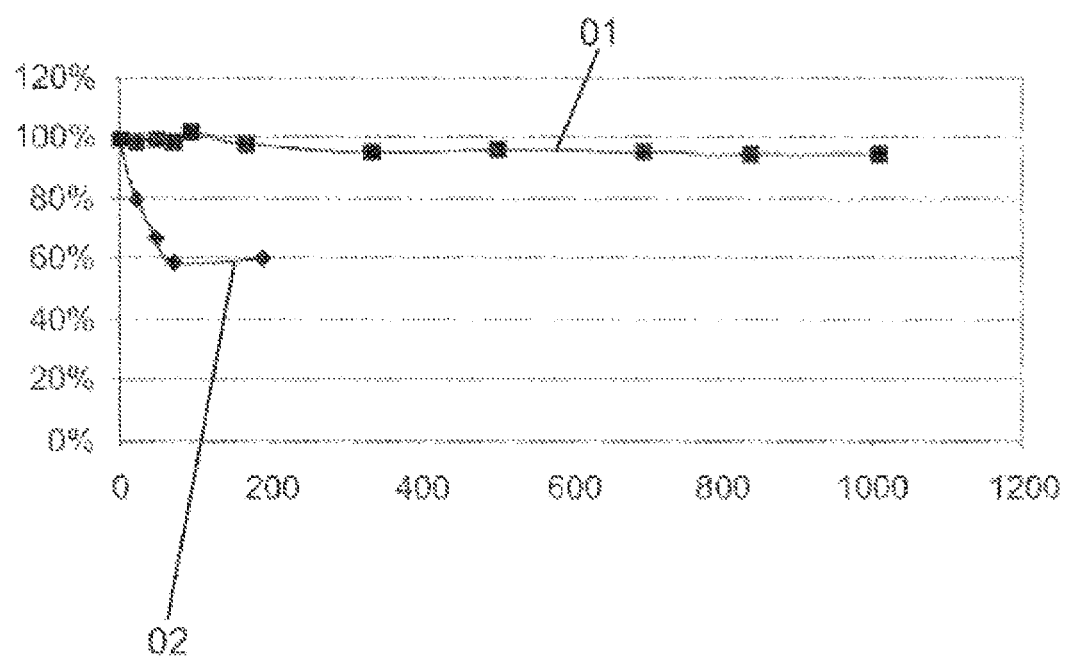

ALKALINE EARTH METAL SILICATE LUMINOPHORES AND METHOD FOR IMPROVING THE LONG TERM STABILITY THEREOF

The present invention relates to alkaline earth metal silicate luminophores having improved long-term stability in the emission behavior. Such luminophores are used, for example, as conversion luminophore in white emitting LED based light sources. The present invention further relates to a method for improving the long-term stability of alkaline earth metal silicate luminophores.

Alkaline earth metal silicate luminophores have a noticeable lack of resistance to moisture, which to date has severely limited their usability in numerous applications. The following chemical equation is considered to be an important unwanted reaction caused by moisture in alkaline earth metal orthosilicate luminophores:

$$(Ba,Sr,Ca)_2SiO_4 + 2 H_2O \rightarrow 2 (Ba,Sr,Ca)OH_2 + SiO_2$$

In case of prolonged storage, the alkaline earth metal silicate luminophores tend to agglomerate and clump together, which strongly limits the use of the luminophores. Moreover, many alkaline earth metal silicate luminophores, if stored for longer periods or used for longer periods, particularly in LED based light sources, exhibit irreversible luminescence losses and degradation phenomena. This occurs particularly at higher air humidities, so that said luminophores are suitable only conditionally for humid room applications and uses in areas with increased air humidity.

DD 293 128 A5 describes a method for the application of protective layers on rare earth oxide halide luminophores. The purpose of the protective layers is to prevent the attack by water, steam, air humidity, and other atmospheric influences as well as influences that act during the processing, so that the luminophore properties are not affected. The protective layer consists of a sparsely soluble tungstenate and/or molybdate compound.

In the scientific article by Guo, C.; Luan, L.; Huang, D.; Su, Q. and Lv, Y.: "Study on the stability of phosphor $SrAl_2O_4$: $Eu^{2+}$, $Dy^{3+}$ in water and method to improve its moisture resistance" in Materials Chemistry and Physics, 106 (2007), pp. 268-272, the improvement of the moisture resistance of $SrAl_2O_3:Eu^{2+}$, $Dy^{3+}$ by the thermal treatment of the luminophore with $NH_4HF_2$ is described. Here, a protective layer made of strontium fluoride forms.

EP 1 124 913 B1 describes a method for treating red light emitting alkaline earth metal sulfide phosphorus particles for improving the moisture resistance thereof. The phosphorus particles are dispersed in a solvent which contains a fluorination agent. In the process, a liquid impermeable fluorinated coating forms on the phosphorus particles.

In the scientific article by Guo, C.; Chu, B. and Su, Q.: "Improving the stability of alkaline earth sulfide-based phosphors" in Applied Surface Science, 225 (2004), pp. 198-203, the coating of the alkaline earth metal sulfide-based luminophore $Ca_{0.8}Sr_{0.2}S:Eu^{2+}$, $Tm^{3+}$ with ZnO and $Al_2O_3$ particles is described.

DE 698 30 180 T2 describes encapsulated luminophore particles which in each case possess a substantially transparent multiple oxide coating based on aluminum oxide. The multiple metal oxide coating comprises an aluminum oxide and at least one additional metal oxide.

In DE 10 2007 056 343 A1, surface-modified luminophore particles based on $(Ca,Sr,Ba)_2SiO_4$ are described, to which a metal, transition metal or semimetal oxide coating and an organic coating are applied. The coating with the metal, transition metal or semimetal oxide occurs in a wet chemistry process or a vapor application process, and it serves to adapt the luminophore surface properties to the chemical properties of binders, as used in LED-based light sources. During the coating, no chemical reaction with the luminophore particle occurs.

DE 10 2007 053 285 A1 describes coated luminophore particles which are prepared by mixing at least two educts and at least one doping substance using wet chemistry methods, and subsequent calcining to luminophore precursors. A coating of the luminophore particles with a metal, transition metal or a semimetal oxide by wet chemistry methods and subsequent calcinations occurs.

The problem of the present invention, based on the prior art, consists of the preparation of alkaline earth metal silicate luminophores that present an improved long-term stability, particularly against moisture. Moreover, a corresponding method is provided for improving the long-term stability of alkaline earth metal silicate luminophores.

The luminophore according to the invention is an alkaline earth metal silicate luminophore. Consequently, the luminophore has a base lattice according to the general chemical formula $EA_xSi_yO_z$ where x, y, z>0. The component EA is formed by one or more alkaline earth metals. An activator, such as, for example, $Eu^{2+}$ or $Mn^{2+}$, is doped into the base lattice. It is also possible to dope several activators well as several coactivators or sensitizer into the base lattice.

The luminophore according to the invention has the fundamental property of absorbing radiation in a first wavelength range, and emitting radiation in a second wavelength range that is different from the first wavelength range. It is thus a conversion luminophore. In a typical embodiment, the luminophore absorbs radiation in the blue and/or ultraviolet wavelength range, and emits radiation in the visible wavelength range, for example, in the yellow-green, yellow and/or orange-colored wavelength range. However, the invention is not limited to certain wavelength ranges.

The luminophore according to the invention is designed in the form of grains. Said grains of the luminophore form particles having, for example, a diameter of 1-40 μm. The invention is not limited to certain particle sizes. In particular, the invention is also suitable for grains having a diameter smaller than 20 μm.

According to the invention, the grains of the luminophore are chemically modified on their surface in that at least portions of their surfaces are formed by a chemical compound of the general formula $Ea_uZ_2$. The component Z is formed by anions which can be chemically combined with the EA cations of the luminophore. The variable u is equal to one ion charge of the anions Z, and preferably u=2 or u=3, and in any case u>0. If the variable u is an even number, then the general formula can also be represented by a formula in which the coefficients are mathematically abbreviated. The luminophore according to the invention is characterized in that the surfaces of the grains are chemically modified. The chemical modification has led to a chemical binding of the alkaline earth metal present in the base lattice. The alkaline earth metal ions of the base lattice have entered in a chemical combination with the anions Z, at least in portions of the surface of the grains. The chemical modification is thus not an exclusively physically acting coating which, for example, was applied by chemical or physical gas phase separation (CVD, PVD) on the grains of the luminophore. An additional difference in comparison to such a coating is that the chemical modification according to the invention does not necessarily have to occur over the entire surface of the grains of the luminophore. It is sufficient if portions of the surface of the grains of the luminophore present the chemical combination of the general formula $EA_uZ_2$. This chemical compound prevents or slows the entry of water and/or the exit of the reaction product with water in or out of the grains of the luminophore, due to reduced diffusion rates. The chemical compound formed by the chemical modification on the surface of the grains is preferably sparsely soluble, which protects the luminophore against moisture for a very long time.

According to the invention, the alkaline earth metal EA of the base lattice of the luminophore is chemically combined on least portions of the surface of the grains with the anions Z. The anions Z can be in the form of elemental anions or also in the form of molecular anions. The person skilled in the art can select appropriate anions in accordance with the actual composition of the base lattice, and in accordance with the selected method for generating the chemical modification.

The compound $EA_uZ_2$ can consist, for example, of $(Sr,Ba,Ca)SO_4$, $(Sr,Ba,Ca)_3(PO_4)_2$, $(Sr,Ba,Ca)CO_3$, $(Sr,Ba,Ca)C_2O_4$, $(Sr,Ba,Ca)SiO_3$ and $(Sr,Ba,Ca)SiF_6$.

The luminophore according to the invention is, furthermore, characterized in that the chemical compound of the general formula $EA_uZ_2$, which is present of the surfaces of the grains, is transparent or at least largely transparent for the radiation in the first wavelength range and for the radiation in the second wavelength range. Therefore, the chemical modification on the surface of the grains does not lead to a reduction in the efficiency of the luminophore. In particular, the chemical compound of the general formula $EA_uZ_2$ has no absorbing properties for radiation having a wavelength of more than 380 nm.

The luminophore according to the invention presents the advantage that it can be produced at low cost, and in a different manner, in adaptation to the actual luminophore and to the actual application, with the chemically modified surface according to the invention.

In preferred embodiments of the luminophore according to the invention, the anions are described by one or more of the following chemical formulas: $SO_4^{2-}$, $PO_4^{3-}$, $CO_3^{2-}$, $C_2O_4^{2-}$, $SiO_3^{2-}$, $F^-$ and $SiF_6^{2-}$. The anions of these formulas are suitable, to a particular extent, to be bound chemically to the cations of the alkaline earth metal, to form a transparent, sparsely soluble, modification of the luminophore, on the surface of the grains of the luminophore. In the case of the $SO_4^{2-}$, $CO_3^{2-}$, $C_2O_4^{2-}$, $SiO_3^{2-}$ and $SiF_6^{2-}$ anions, u=2. In the case of the $PO_4^{3-}$ anions, u=3. In the case of the anions $F^-$ anions, u=1.

In a preferred embodiment of the luminophore according to the invention, the base lattice is described by the formula $(Ba_a,Sr_b,Ca_c)_2SiO_4$. At least one of the variables a, b and c is greater than 0, and a+b+c=1. This luminophore is an alkaline earth metal orthosilicate which is particularly suitable for use in LED-based light sources.

In additional preferred embodiments of the luminophore according to the invention, EA in the base lattice comprises magnesium and an additional alkaline earth metal. In these embodiments, the base lattice has one of the following chemical formulas: $EA'_3MgSi_2O_8$, $EA'_2MgSi_2O_7$ and $EA'_2MgSiO_5$, where EA' is formed by one or more alkaline earth metals except magnesium.

Additional preferred embodiments of the luminophore according to the invention comprise a base lattice of the chemical formula $EA_3SiO_5$ or $EASiO_3$.

In a special embodiment of the luminophore according to the invention, in each case the entire surface of the grains of the luminophore is formed by the chemical compound of the general formula $EA_uZ_2$. Consequently, the entire surfaces of the grains are chemical modified.

The silicon in the alkaline earth metal silicate can be replaced partially with aluminum, boron, germanium, gallium and/or phosphorus. Such possibilities of modification of alkaline earth metal silicate luminophores are known to the person skilled in the art. In any case, a person skilled in the art would also refer to such a modified luminophore as an alkaline earth metal silicate, and refer to it, in most cases, using the general formula $EA_xSi_yO$. For a particularly precise nomenclature, the person skilled in the art may optionally indicate the general formula $EA_x(Si,Al,B,Ge,Ga,P)_yO_z$, or also the formula $EA_{X}(Si_{1-e-f-g-h-i}Al_eB_fGe_gGa_hP_i)_yO_z$, where e, f, g, h and/or i>0. An additional possible modification of the alkaline earth metal silicate luminophore is the incorporation of up to 10 mol % halide ions.

The method according to the invention is used to improve the long-term stability of luminophores, particularly alkaline earth metal silicate luminophores. Said luminophores present a base lattice according to the general chemical formula $EA_{X}Si_yO_z$, where EA is formed by one or more alkaline earth metals, and the condition x, y, z>0 applies. The luminophore to be improved is in the form of grains. The method according to the invention comprises first a step in which a chemical substance is selected, which makes available anions that can be chemically combined with the EA cations of the luminophore. The chemical substance can be, for example, a chemical element or a chemical compound, which is in solid, liquid or gaseous form. However, the chemical substance can also be a substance mixture, for example, an aqueous solution. The property of the chemical substance that is relevant for the method according to the invention is that anions can be released by said chemical substance, anions which can be chemically combined with the cations of the alkaline earth metal. In an additional step of the method according to the invention, the chemical substance is to be mixed with the grains of the luminophore, in order to prepare a chemical reaction of the chemical substance, particularly the anions released by the chemical substance, with the surface of the grains of the luminophore, in particular with the cations of the alkaline earth metal that are present there. Moreover, conditions must be ensured that make it possible to allow the mentioned chemical reaction to take place. For this purpose, the grains of the luminophore mixed with the chemical substance must be, for example, heated, stirred, or exposed to a special atmosphere. The person skilled in the art will select the conditions in accordance with the selected chemical substance and the actual composition of the alkaline earth metal silicate. The chemical reaction can be described as follows:

$$u\ EA^{2+} + 2\ Z^{u-} \rightarrow EA_uZ_2$$

The component Z stands for the anions. The variable u is equal to the ion charge of the anions Z, and preferably u=2 or u=3, in any case u>0. The reaction occurs particularly on free surfaces of the grains of the luminophore. With increasing thickness of the areas modified as $EA_uZ_2$, the reaction rate decreases, so that the total conversion is diffusion-determined. At the same time, this context results in the preferred formation of dense $EA_uZ_2$ areas instead of point-shaped formations. In an additional step of the method according to the invention, the grains of the luminophore must be submitted to a secondary treatment after the chemical reaction, namely they must be separated, for example, by washing, drying, or by a gas flow.

The method according to the invention describes a low-cost and adaptable possibility to considerably improve the long-term stability of alkaline earth metal silicate luminophores. Here, it is essential that the reaction of the EA of the luminophore grain with the anions Z of the chemical substance is forced to take place, for thermodynamically reasons, at the energetically preferred sites, which are also particularly susceptible for the reaction with water. If said energetically preferred sites are blocked by the mentioned modification for a reaction with water, a clear increase in the moisture resistance of the luminophore grains already results therefrom. If the reaction between the luminophore grains and the chemical substance is continued, the final result is a material having a completely modified surface and a substantially increased long-term stability. The thickness of the modified surface layer is proportional to the reactivity of the original surface. Thus, it is guaranteed that the modified grains have undergone an isotropic stabilization, and that there are no longer any preferred points of attack.

The anions to be made available by the chemical substance have to be suitable so they can be chemically combined with the cations of the alkaline earth metal. Here, the chemical substance, on the one hand, must be selected in such a manner that the anions made available by it enter with the cations of the alkaline earth metal into a chemical compound which is particularly sparsely soluble, and transparent to a high degree. On the other hand, the chemical substance must be selected in such a manner that the chemical reaction between the anions made available by the chemical substance, and the cations of the alkaline earth metal EA is made possible. Particularly suitable chemical substances that make available the anions are those described by one of the following formulas: $SO_4^{2-}$, $PO_4^{3-}$, $CO_3^{2-}$, $SiO_3^{2-}$ and $SiF_6^{2-}$.

In a first preferred embodiment of the method according to the invention, the chemical reaction occurs in an aqueous suspension. For this purpose, the selection of the chemical substance occurs by selecting a soluble chemical compound containing the anions, and dissolving it in water. The mixing of the grains of the luminophore with the chemical substance occurs due to the fact that the grains are introduced into the aqueous solution, and the aqueous solution is stirred. The separation of the grains of the luminophore occurs preferably first by decanting, filtering or centrifuging. Next a drying process takes place. Optionally, the grains are to be washed with water before the drying, and suspended in ethanol.

In an alternative preferred embodiment of the method according to the invention, the modification of the surface of the grains occurs by a solid-gas phase reaction. For this purpose, the chemical substance to be selected is in the form of a gas, such as, for example, gaseous $SO_3$. The mixing of the grains of the luminophore with the chemical substance occurs by having the grains be exposed to gas flowing around them, for example, due to the grains being exposed in an oven to a flow of the gas.

In an additional alternative embodiment of the method according to the invention, the chemical modification occurs by a chemical reaction between solid substances in a dry state. For this purpose, the chemical substance is selected by selecting a powdered chemical compound containing the anions. The mixing of the grains of the luminophore with the chemical substance occurs due to the fact that the grains are mixed and homogenized with the powdered chemical compound, which prepares the chemical reaction.

Figure 2:
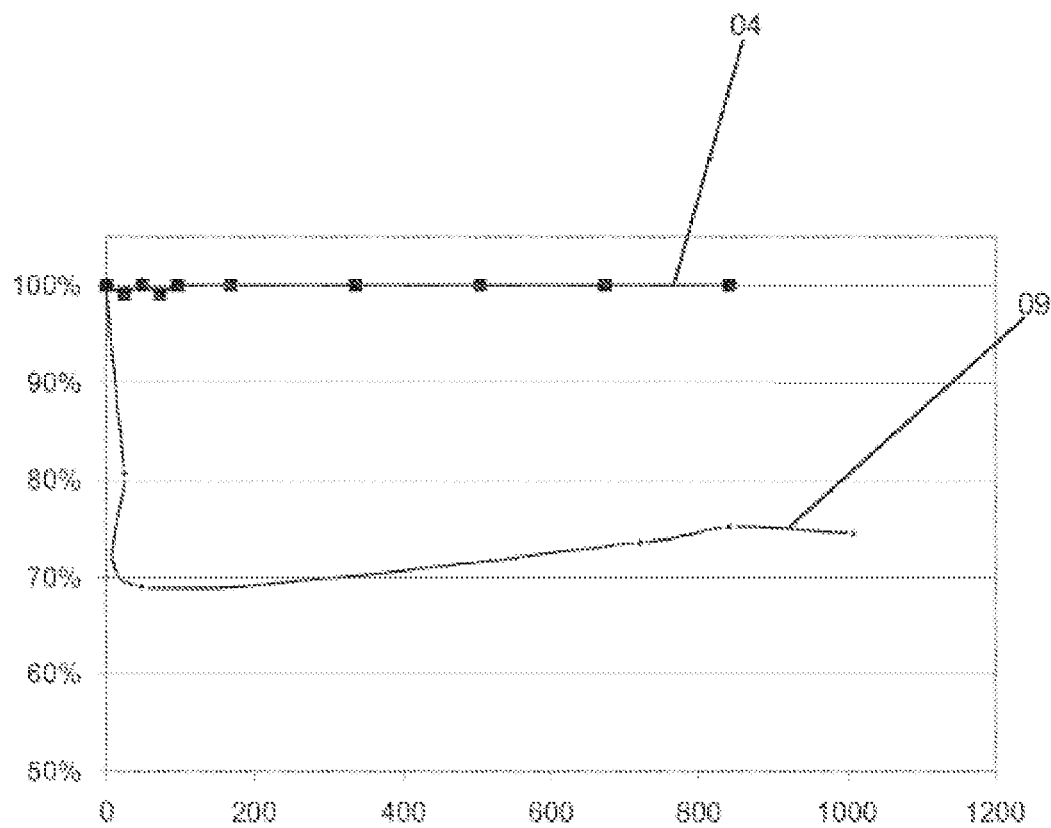
Figure 3:
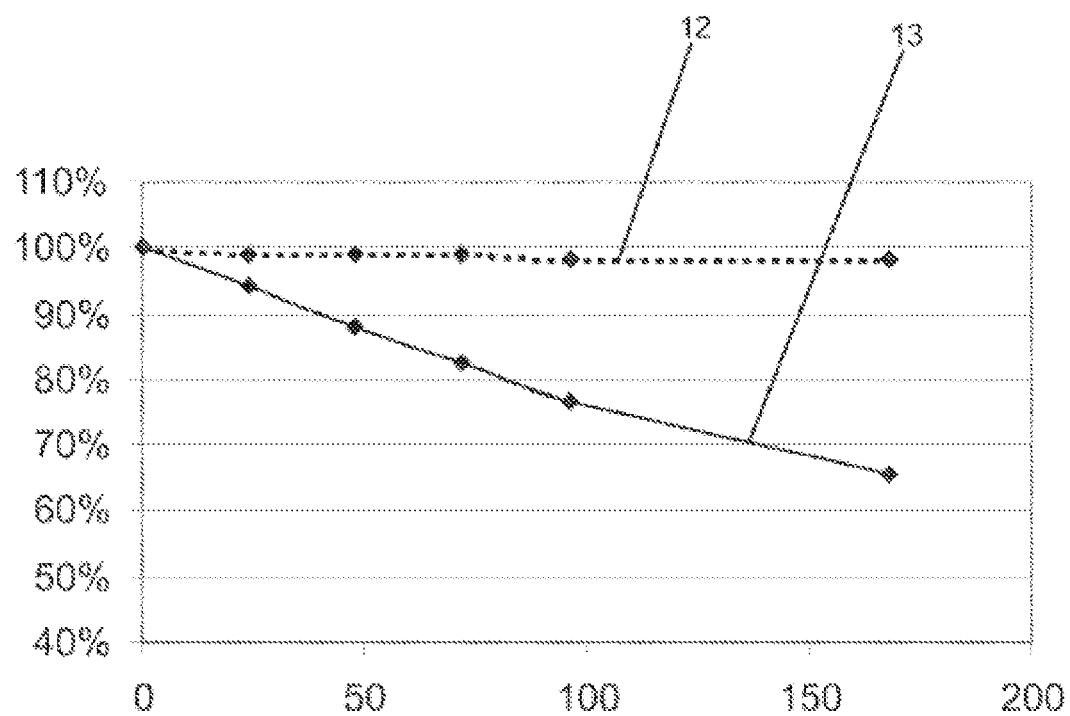

Additional advantages, details and variants of the invention can be obtained from the following description of preferred embodiments, in reference to the drawing. The figures show:

FIG. 1: a diagram of the long-term stability of an alkaline earth silicate luminophore modified with hexafluorosilicate;

FIG. 2: a diagram of the long-term stability of an alkaline earth metal silicate luminophore modified according to the invention with ammonium carbonate;

FIG. 3: a diagram of the long-term stability of an alkaline earth metal silicate luminophore modified according to the invention with ammonium fluoride.

FIG. 1 describes a diagram in which the long-term stability of an alkaline earth metal silicate luminophore modified with hexafluorosilicate is compared to the long-term stability of an alkaline earth metal silicate luminophore according to the prior art. For the modification, according to the invention, of the surfaces of the grains of the alkaline earth metal silicate luminophore, a solution of $(NH_4)_2SiF_6$ in deionized water was prepared. 50 g of the alkaline earth metal silicate luminophore $(Ba,Sr,Ca,Mg)_2SiO_4$:Eu are added to 200 mL of said aqueous solution under stirring. The aqueous solution was heated, and the temperature was kept constant at 25° C. The stirring was stopped after 20 min. The alkaline earth metal silicate which was chemically modified on the surface of the grains was subsequently washed three times by decanting with water. The suspended alkaline earth metal silicate luminophore was removed by suction, and finally dried at 105° C. The actual test parameters are not limited to the values indicated here. The modified surface consists predominantly of alkaline earth hexafluorosilicate $EASiF_6$. A graph 01 represents the dependency of the relative emission intensity in percent with respect to the duration in hours of a storage at a temperature of 60° C. and at an air humidity of 90%. The alkaline earth metal silicate luminophore which was modified according to the invention also presents, after a storage duration of more than 1000 hours, a relative emission intensity of considerably more than 90%. In the diagram, a graph 02 is also represented, which represents the relative emission intensity of an unmodified alkaline earth metal silicate luminophore according to the prior art as a function of the duration in hours of a storage at a temperature of 60° C. and at 90% air humidity. The graph 02 illustrates that the relative emission intensity with this luminophore according to the prior art has already decreased to less than 60% after only ten hours.

FIG. 2 describes a diagram of the long-term stability of an alkaline earth metal silicate luminophore which has been modified according to the invention with an ammonium carbonate solution, in comparison to the long-term stability of an alkaline earth metal silicate luminophore according to the prior art. For the modification according to the invention with an ammonium carbonate solution, a solution of $NH_4HCO_3$ in deionized water was prepared first. 25 g of the alkaline earth metal silicate luminophore according to the general formula $(Ba,Sr,Ca)_3MgSi_2O_8$:Eu were added to 200 mL of said aqueous solution under stirring. The aqueous solution was heated, and the temperature was kept constant at 40° C. The stirring was stopped after a duration of 60 min. The modified alkaline earth metal silicate was washed three times by decanting with water, removed by suction, and finally dried at 105° C. The actual test parameters are not limited to the values indicated here. The modified surface consists predominantly of alkaline earth carbonate $EACO_3$. The relative emission intensity of the alkaline earth metal silicate luminophore according to the invention, which has been modified in this manner, is represented as a function of the duration in hours of a storage at a temperature of 60° C. and at an air humidity of 90% in a graph 04. The relative emission intensity of said alkaline earth metal silicate luminophore according to the invention, in the case of a storage duration of several hundred hours, continues to be nearly 100%. On the other hand, the relative emission intensity of an unmodified alkaline earth metal silicate luminophore according to the prior art, which is represented by a graph 09 as a function of the storage duration in hours, is already only approximately 70% after a storage duration of less than 100 hours.

In an additional preferred embodiment, for the modification according to the invention, with an ammonium phosphate/ammonium oxalate solution, a 0.05 M solution of $(NH_4)_3PO_4$ and a 0.05 M solution of $(NH_4)_2C_2O_4$ in deionized water was prepared first, and equal volumes of the two solutions were combined. 25 g of the alkaline earth metal silicate luminophore according to the general formula $(Ba,Sr,Ca)_2SiO_4$:Eu were added to 200 mL of said aqueous solution under stirring. The aqueous solution was heated, and the temperature was kept constant at 40° C. The stirring was stopped after a duration of 30 min. The modified alkaline earth metal silicate was washed three times by decanting with water, removed by suction, and finally dried at 95° C. The actual test parameters are not limited to the values indicated here. The modified surface consists predominantly of alkaline earth phosphate $EA_3(PO_4)_2$ and of alkaline earth oxalate $EAC_2O_4$. The alkaline earth metal silicate luminophore which was modified according to the invention, even after a storage duration of more than 1000 hours, presents a relative emission intensity that is considerably higher than 90%. In an unmodified alkaline earth metal silicate luminophore according to the prior art, on the other hand, the relative emission intensity during a storage at a temperature of 60° C. and at 90% air humidity has already decreased to less than 60% after only ten hours.

In an alternative preferred embodiment of the method according to the invention, the chemical reaction for the modification of the surface of the grains of the alkaline earth metal silicate luminophore occurs in a solid-gas phase reaction. This can occur, for example, due to the fact that 25 g of the alkaline earth metal silicate luminophore of formula $(Ba,Sr,Ca)_2MgSi_2O_7$:Eu on an aluminum oxide nacelle are heated in a tubular furnace under flowing nitrogen with a volume flow rate of 5 L/min to a temperature of 200° C. The nitrogen flowing into the tubular furnace is humidified prior to the entry into the tubular furnace, by being bubbled through a water-filled washing bottle. After the alkaline earth metal silicate luminophore has been heated to 200° C., a second gas flow of $SO_3$ with a maximum volume flow rate of 1 L/min is introduced. The two gas flows flow around the alkaline earth metal silicate luminophore, so that the chemical reaction for the modification of the grains of the luminophore can occur. After a reaction time of 30 min, the $SO_3$ gas flow is stopped, and the input of heat is stopped, so that the luminophore cools rapidly in the nitrogen atmosphere. In the aluminum oxide nacelle, the alkaline earth metal silicate luminophore modified according to the invention is now present. Instead of $SO_3$, $CO_2$ can also be used as gas flow.

In FIG. 3, a diagram is represented showing the long-term stability of an alkaline earth metal silicate luminophore modified with aluminum fluoride according to the invention, in comparison to an unmodified alkaline earth metal silicate luminophore according to the prior art. In the case of the modification with aluminum fluoride according to the invention, two solid powdered substances react in a dry state. In the represented example, 25 g of an alkaline earth metal silicate luminophore of the general formula $(Ba,Sr,Ca,Mg)_3SiO_5$:Eu are mixed and homogenized with 10 g finely ground $NH_4F$. The mixture on an aluminum oxide nacelle was placed in a tubular furnace, and slowly heated under flowing nitrogen with a volume flow rate of 5 L/min to a temperature of 300° C. The mixture was left to stand for a duration of 30 min under these conditions, and then cooled rapidly. A graph 12 represents the relative intensity of this alkaline earth metal silicate luminophore modified according to the invention, as a function of the duration in hours of a storage at a temperature of 85° C. and at a relative air humidity of 85%. In graph 12, one can see that the relative intensity of the luminophore according to the invention has decreased little after a storage duration of 150 hours, and continues to be considerably higher than 90%. A graph 13 represents the relative intensity of an unmodified alkaline earth metal silicate luminophore according to the prior art as a function of the duration in hours of a storage at 85° C. and a relative air humidity of 85%. After a storage duration of 150 hours, the relative intensity of alkaline earth metal silicate luminophore has already taken on a value of less than 70%.

The described embodiment of the method according to the invention is suitable for a modification of the surface of the grains of the luminophore with a fluoride or a carbonate using the corresponding ammonium compounds.

List Of Reference Numerals
01 Graph of the long-term stability of an alkaline earth silicate luminophore modified with hexafluorosilicate
02 Graph of the long-term stability of an alkaline earth metal silicate luminophore according to the prior art
03 -
04 Graph of the long-term stability of an alkaline earth metal silicate luminophore modified with ammonium carbonate solution
05 -
06 -
07 -
08 -
09 Graph of the long-term stability of an alkaline earth metal silicate luminophore according to the prior art
10 -
11 -
12 Graph of the long-term stability of an alkaline earth metal silicate luminophore modified with ammonium fluoride
13 Graph of the long-term stability of an alkaline earth metal silicate luminophore according to the prior art

The invention claimed is:

1. A luminophore having an improved long-term stability, which absorbs radiation in a first wavelength range, and emits radiation in a second wavelength range that is different from the first wavelength range, wherein the luminophore is designed in the form of grains, and comprises an alkaline earth metal silicate of the general chemical formula $EA_xSi_yO_z$ as a base lattice, which is doped with an activator, wherein EA is formed by one or more alkaline earth metals, and the condition x, y, z>0 applies, wherein said base lattice is described by one of the following chemical formulas:

$(Ba_aSr_bCa_c)_2SiO_4$, wherein at least one of the variables a, b and c is greater than zero, and a+b+c=1;

$EA'_3MgSi_2O_8$, $EA'_2MgSi_2O_7$, $EA'_2MgSiO_5$, where EA' is formed by one or more alkaline earth metals excluding magnesium; and $EA_3SiO_5$, and wherein the grains are chemically modified on their surface such that at least portions of their surface are formed by a chemical compound of the general formula $EA_uZ_2$, wherein the general formula can be represented by a formula in which the coefficients are mathematically abbreviated if the variable u is even; and wherein Z is formed by anions which can be chemically combined with cations of EA, and which are described by one of the following chemical formulas: $SO_4^{2-}$, $PO_4^{3-}$, $CO_3^{2-}$, $C_2O_4^{2-}$, $SiO_3^{2-}$, and $SiF_6^{2-}$; wherein u is equal to an ion charge of the anions Z.

2. The luminophore according to claim 1, wherein the activator is formed by $Eu^{2+}$ and/or $Mn^{2+}$.

3. The luminophore according to claim 1, such that the entire surface of the grains of the luminophore is formed by the chemical compound of the general formula $EA_uZ_2$, wherein the general formula can be represented by a formula in which the coefficients are mathematically abbreviated if the variable u is even.

4. A method for improving the long-term stability of luminophores which are designed in the form of grains, and which comprise an alkaline earth metal silicate of the general chemical formula $EA_xSi_yO_z$ as a base lattice, wherein EA is formed by one or more alkaline earth metals, and the condition x, y, z>0 applies, wherein said base lattice is described by one of the following chemical formulas:

$(Ba_aSr_bCa_c)_2SiO_4$, wherein at least one of the variables a, b and c is greater than zero, and a+b+c=1;

$EA'_3MgSi_2O_8$, $EA'_2MgSi_2O_7$, $EA'_2MgSiO_5$, where EA' is formed by one or more alkaline earth metals excluding magnesium; and $EA_3SiO_5$, comprising the following steps:

selecting a chemical substance which makes available anions that can be combined chemically with cations of EA, and which are described by one or more of the following chemical formulas: $SO_4^{2-}$, $PO_4^{3-}$, $CO_3^{2-}$, $C_2O_4^{2-}$, $SiO_3^{2-}$, and $SiF_6^{2-}$;

mixing grains of a luminophore with the chemical substance;

preparing conditions for a chemical reaction between the chemical substance and the surface of the grains of the luminophore; and separating the grains of the luminophore.

5. The method according to claim 4, such that selecting a chemical substance includes selecting a chemical compound which contains the anions, and by dissolving said chemical compound in water;

mixing the grains of the luminophore with the chemical substance includes introducing the grains into an aqueous solution, and stirring the aqueous solution; and separating the grains of the luminophore includes drying the grains.

6. The method according to claim 4, wherein the chemical substance is in a form of a gas; and mixing the grains of the luminophore with the chemical substance includes flowing the gas around the grains.

7. The method according to claim 4, wherein selecting the chemical substance includes selecting a powdered chemical compound containing the anions; and mixing the grains of the luminophore with the chemical substance includes mixing and homogenizing the grains with the powdered compound.

8. The luminophore according to claim 2, such that the entire surface of the grains of the luminophore is formed by the chemical compound of the general formula $EA_uZ_2$, wherein the general formula can be represented by a formula in which the coefficients are mathematically abbreviated if the variable u is even.

* * * * *